United States Patent [19]

Cockroft et al.

[11] 4,227,128
[45] Oct. 7, 1980

[54] SPEED RESPONSIVE MOTOR CONTROL CIRCUIT

[75] Inventors: James B. Cockroft, Wauwatosa; Peter J. Ernster, Glendale, both of Wis.

[73] Assignee: Sunbeam Corporation, Chicago, Ill.

[21] Appl. No.: 915,977

[22] Filed: Jun. 16, 1978

[51] Int. Cl.³ .............................................. H02P 5/08
[52] U.S. Cl. ............................... 318/325; 318/345 D; 318/462; 200/80 R
[58] Field of Search ........... 318/325, 462, 331, 345 G, 318/345 H, 345 CB, 345 D; 200/80; 338/198, 200, 172, 191; 366/282, 601

[56] References Cited

U.S. PATENT DOCUMENTS

| | | | |
|---|---|---|---|
| 3,348,113 | 10/1967 | Vichr | 318/345 F |
| 3,389,317 | 6/1968 | Prewitt | 318/325 |
| 3,403,314 | 9/1968 | Maynard | 318/345 H |
| 3,455,118 | 7/1969 | Petranek | 318/345 H |
| 3,456,180 | 7/1969 | Athey et al. | 318/325 |
| 3,546,556 | 12/1970 | Benkert et al. | 310/50 |
| 3,699,418 | 10/1972 | Sasabe et al. | 318/325 |
| 3,701,935 | 10/1972 | Collie | 318/325 |
| 3,730,490 | 5/1973 | Oberg | 318/349 |
| 3,733,396 | 5/1973 | Luther | 200/80 R |
| 3,875,485 | 4/1975 | Hornung | 318/345 D |
| 3,949,347 | 4/1976 | Gilbreath | 338/200 |
| 4,087,728 | 5/1978 | Porter | 318/626 |

*Primary Examiner*—David Smith, Jr.

*Attorney, Agent, or Firm*—George R. Clark; Neil M. Rose; Robert J. Fox

[57] ABSTRACT

A motor control circuit is provided for an appliance or the like of the type utilizing a speed adjustment device that controls an adjustable centrifugally controlled governor device. The governor includes a switch contact arrangement which is connected in the triggering circuit of a power switching device, a TRIAC for example, for selectively connecting the motor of the appliance to the power source connections. The switch contacts of the governor device open and close as the rotational speed of the motor increases and decreases respectively from the speed selected on the speed adjustment device. A variable impedance element mechanically coupled to and adjusted by the speed adjustment device is also provided in the triggering circuit of the power switching device in series with the governor switch contacts to vary the triggering of the power switching device as the speed setting is varied. Thus, a variable speed versus motor supply voltage characteristic is provided when the governor contacts are closed. A wider range of stable speed control is provided than is obtained with a governor device alone. Low speed cogging and high speed hunting problems are also minimized. The variable impedance element in various embodiments is arranged to provide a variable impedance characteristic over a portion of the speed adjustment device range and a fixed impedance over the remainder of the range.

20 Claims, 9 Drawing Figures

SPEED RESPONSIVE MOTOR CONTROL CIRCUIT

BACKGROUND OF THE INVENTION

A. Field of the Invention

The present invention relates generally to motor control circuits and more specifically to an improved motor control circuit for small appliances utilizing speed adjustment devices controlling an adjustable centrifugal governor device.

B. Description of the Prior Art

In the motor control circuit field, there are various types of governor and solid state devices utilized to improve motor performance and achieve control features.

For example, U.S. Pat. No. 3,701,395 which issued to A.A. Collie on Oct. 31, 1972, describes a solid state control circuit for a motor wherein a centrifugal governor including a pair of contacts is utilized in the triggering circuit of a TRIAC to selectively trigger the TRIAC and thus control the motor speed upon the opening and closing of the governor contacts in response to the variations in the motor speed. In this way, it is not necessary for the governor contacts to carry the full motor current.

Variations of this type of control circuit are illustrated in U.S. Pat. No. 3,317,807 which issued to J. Dorfner et al on May 2, 1967, and U.S. Pat. No. 3,223,911, which issued to E. F. Seiler et al on Dec. 14, 1965. The Dorfner patent describes a capacitive coupling system to the governor to eliminate slip ring connections. The Seiler patent describes the governor control in the triggering circuits of various combinations of switching devices.

The motor control circuit in application Ser. No. 916,189 filed on June 16, 1978 by G. Ponczek and D. Stahly provides a control path independent of the governor device to fire a TRIAC power switching device for a predetermined portion of each AC cycle even when the governor contacts are open. Thus, a minimum voltage and a base power level is provided to the motor each cycle. This arrangement alleviates low speed operation problems and modifies the strictly on-off characteristics of a motor control circuit utilizing only a governor device by decreasing the voltage variations seen by the motor.

While the aforementioned motor control circuits are generally suitable for their intended use and application, they are not totally satisfactory in applications where a wider range of speed control is desired over varying load conditions to operate the controlled motor without hunting or cogging throughout the speed control range and in a smooth continuous manner.

SUMMARY OF THE INVENTION

It is therefore a primary object of the present invention to provide a new and improved motor speed control circuit for controlling a wide range of motor speeds in a stable manner without hunting or cogging.

It is another object of the present invention to provide a motor speed control circuit for use in small appliances utilizing a speed adjusment device controlling an adjustable centrifugal governor device wherein a power switching device selectively connects the motor to the power source connections; the power switching device being controlled by a contact pair of the governor device and at least one variable impedance element controlled by the speed adjustment device.

It is a further object of the present invention to provide a motor control circuit for use in a small appliance utiliziing an adjustable governor device under the control of a speed adjustment control wherein a variable impedance is controlled by the speed adjustment control to vary the conduction angle of a power switching device thus applying variable power levels to the motor in accordance with the setting of the speed adjustment control.

It is another object of the present invention to provide a motor control circuit in a small appliance utilizing a speed adjustment control to condition an adjustable centrifugal governor wherein variable impedances under the control of the speed adjustment device are connected in the triggering circuit of the power switching device to supply a first predetermined base power level to the motor when a set of governor switch contacts are open and a second predetermined power level when the governor contacts are closed; the first and second predetermined power levels being independently determined levels with one or both of these levels being variable in a predetermined manner over the control range of the speed adjustment device.

Briefly, in accordance with one aspect of the present invention, a motor control circuit is provided for an appliance or the like of the type utilizing a speed adjustment device that controls an adjustable centrifugally controlled governor device. The governor includes a switch contact arrangement which is connected in the triggering circuit of a power switching device, a TRIAC for example, for selectively connecting the motor of the appliance to the power source connections. The switch contacts of the governor device open and close as the rotational speed of the motor increases and decreases respectively from the speed selected on the speed adjustment device. A variable impedance element mechanically coupled to and adjusted by the speed adjustment device is also provided in the triggering circuit of the power switching device in series with the governor switch contacts to vary the triggering of the power switching device as the speed setting is varied. Thus, a variable speed versus motor supply voltage characteristic is provided when the governor contacts are closed. A wide range of stable speed control is provided than is obtained with a governor device alone. Low speed cogging and high speed hunting problems are also minimized. The variable impedance element in various embodiments is arranged to provide a variable impedance characteristic over a portion of the speed adjustment device range and a fixed impedance over the remainder of the range.

The invention both as to its organization and method of operation together with further objects and advantages thereof will best be understood by reference to the following specification taken in conjunction with the accompanying drawings.

BRIEF DESCRIPTION OF THE DRAWINGS

For a better understanding of the invention, frequent reference will be made to the drawings, wherein.

DESCRIPTION OF THE PREFERRED EMBODIMENT

Figure 1:
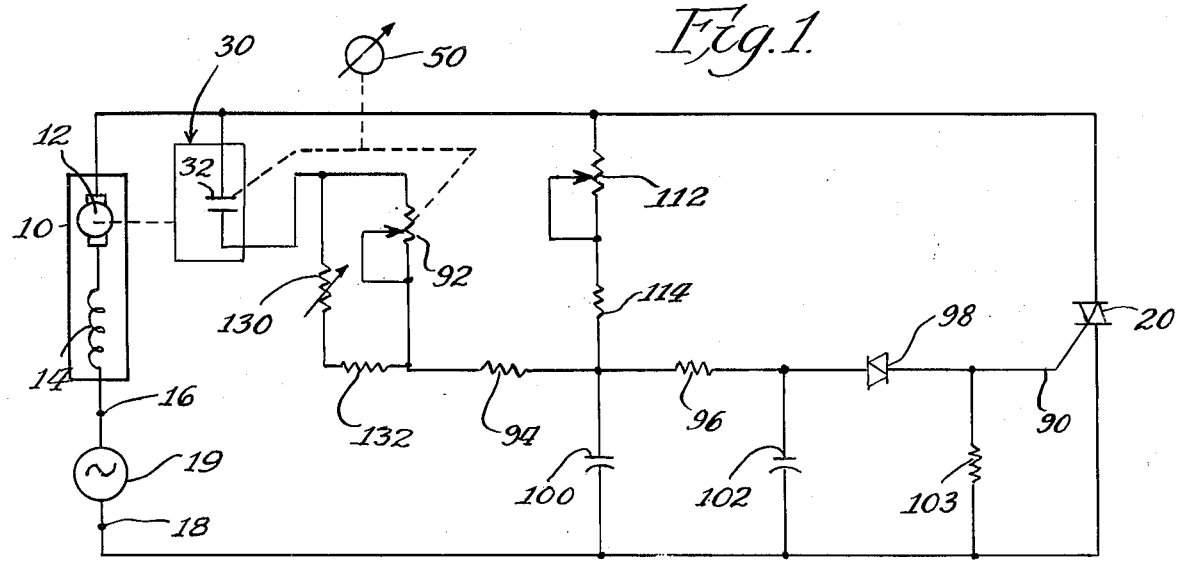
FIG. 1 is a schematic diagram of one embodiment of the motor control circuit of the present invention.
Figure 2:
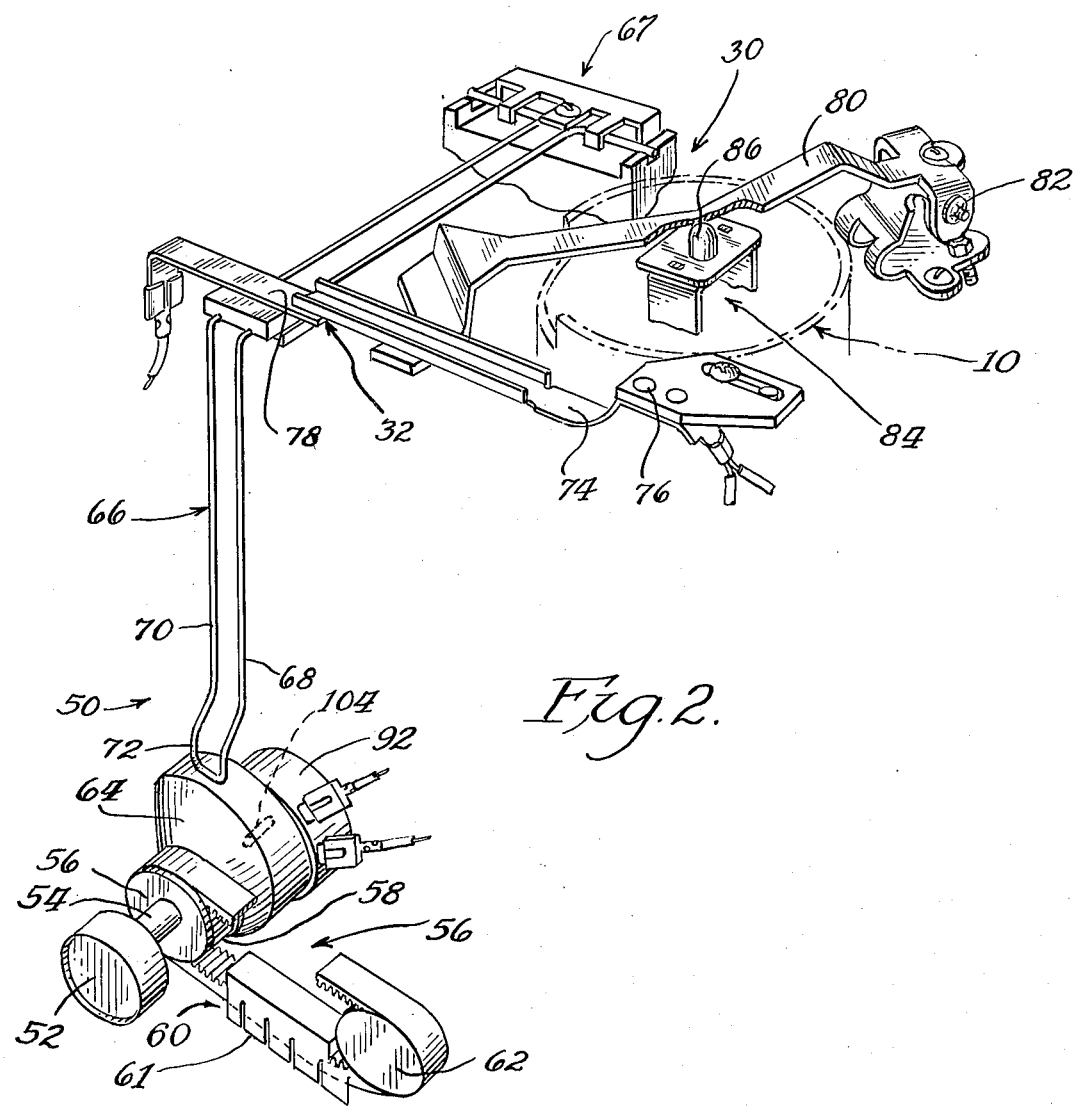
FIG. 2 is a perspective view of portions of the motor control circuit of FIG. 1 in conjunction with a food processor.

Referring to the drawings, there is shown in FIGS. 1 and 2 the motor control circuit of the present invention in conjunction with an alternating current motor 10. The armature circuit 12 of the motor 10 is connected in series with a field coil 14, a pair of power source connection terminals 16, 18 and the main conductive path of a power switching device, for example a TRIAC 20. The power source connection terminals 16, 18 are arranged for connection to an AC power source 19 of suitable voltage, a 110 v/60 Hz supply for example. The motor control circuit of the present invention is illustrated in conjunction with the control of the motor 10 of a small appliance such as a food mixer or processor although it should be understood that the motor control circuit has application in other fields as well as a speed control circuit.

A mechanical centrifugally operated governor device referred to generally at 30 is coupled to the shaft of the motor 10 and rotates therewith and is of the same general type as illustrated and described in U.S. Pat. No. 2,703,381 which issued to I. Jepson on Mar. 1, 1955. This type of governor device 30 includes a pair of contact terminals 32 defining a switch which is operated by the rotating, centrifugally influenced governor members when the speed of the motor 10 exceeds a predetermined speed to which the governor has been adjusted. In this regard, the governor 30 is of the type that is adjustable and associatively coupled to a speed adjustment control referred to generally at 50.

The speed control 50 in one embodiment includes a knob which is rotated to determine the speed of operation of the appliance by adjustment of the governor device 30. The adjustment to the governor device is accomplished by a lever arm of the speed control 50 positioning a contact arm of the governor device relative to a sensing arm of the governor device. The sensing arm is controlled by a centrifugally influenced governor member. Briefly, as the speed of the motor 10 increases, the sensing arm displaces the contact arm away from the lever arm. The contact pair 32 is formed by the lever arm and the contact arm. In accordance with the characteristics of the governor members and the setting of the speed control 50, at a predetermined speed the contact pair 32 opens. Similarly, when the speed decreases below the predetermined speed the contact pair 32 closes. Thus, as the speed adjustment control 50 is rotated to different speed positions within the operating range of the appliance, the centrifugally operated governor device 30 is arranged to open and close the contact pair 32 at various corresponding rotational speeds of the motor 10. The motor control circuit is also provided with an on-off switch, not shown, in series with the power source connections 16, 18. The speed adjustment control 50 in an alternate specific embodiment includes an on-off switch in series with the power source 19 to control the operational state of the overall motor control circuit.

The speed control 50 in one embodiment, FIG. 2, comprises a knob 52 with an affixed shaft 54. A speed and function display 56 is driven by the shaft 54 and includes a drive gear 58 carried on the shaft 54 and an interfitting display strip indicator 60 disposed about the drive gear 58 and an idler wheel 62. A widened section of the display strip 60 is visible through a display panel referred to generally at 61 including various numerical and functional indicia. Also carried on the shaft 54 is an eccentric circular cam 64 in engagement with a pivotally mounted right angle lever arm 66. The lever arm 66 extends in the vicinity of the governor device 30 and is pivoted at 67. The lever arm 66 generally in the shape of an elongated U is formed by two parallel rod-leg portions 68, 70 connected by a curved section 72 arranged to ride on the cam 64.

The governor device 30 includes a contact arm 74 pivoted at one end 76 and contacting the lever arm 66 at a contact pad 78 insulated from and carried by the lever arm 66. A sensing arm 80 is arranged across the motor 10 and is pivotally supported at one end at 82 on the motor housing. The other end of the sensing arm 80 extends to a position under the contact arm 74. The contact arm 74 and the contact pad 78 determine the constant terminal pair 32 by means of suitable contact terminal arrangements on the respective parts not shown in detail. The speed responsive mechanism 84 of the governor device 30 not shown in detail is disposed at the center of the motor 10 and includes a movable contact element 86 having a rounded head portion which is in contact with the sensing arm 80. As the rotational speed of the motor 10 increases, the movable contact pin 86 moves outward from the motor 10 (generally upward in FIG. 2) to displace the engaged sensing arm 80 in accordance with the speed.

Thus, as the speed adjustment knob 52 is rotated to higher speed positions, the cam 64 pivots the lever arm 66 and moves the contact arm 74 relatively farther from the sensing arm 80. Accordingly, the sensing arm 80 requires a greater dimensional displacement by the speed responsive movable element 86 of the governor 30 to open the contact pair 32. The contact arm 74 and the speed responsive movable contact element 86 both move generally in an upward direction in FIG. 2 in response to increased motor speed. The orientation of the governor device 30 and the speed adjusting elements of FIG. 2 are illustrated in an inverted relationship for clarity relative to the normal placement in an appliance. Thus, an upward movement in FIG. 2 is a generally downward vertical movement in a normally positioned appliance utilizing the motor control circuit of the present invention.

In accordance with important aspects of the present invention, one terminal of the contact pair 32 is connected between the armature circuit 12 and the TRIAC power switching device 20. The other terminal of the contact pair 32 is connected to the gate or signal control lead 90 of the TRIAC 20 through the series combination of a variable resistor 92, two series control resistors 94 and 96 and a DIAC (bi-directional diode) 98.

Thus when the contact pair 32 is closed, the gate lead 90 triggers the TRIAC 20 into conduction at a predetermined point or firing angle of each half-cycle of the alternating cycle waveform of the power source 19 as determined by the impedance elements of the control circuit. A phase control capacitor 100 is connected between the power source connection 18 and the junction of the two series control resistor 94 and 96. A secondary phase delay capacitor 102 in a specific embodiment is connected between the power source connection terminal 18 and the junction of the control resistor 96 and the DIAC 98. A leakage control resistor 103 may be provided between the signal control lead 90 and the power source connection 18.

In accordance with an important aspect of the present invention, the variable resistor 92 is operatively connected to the speed adjustment control 50 so as to be varied in accordance with the rotational setting thereof. Specifically, the variable resistor 92 is a potentiometer having a rotary adjustment shaft 104 connected to the speed control shaft 54 and arranged on the shaft after the cam 64.

Figure 4A:
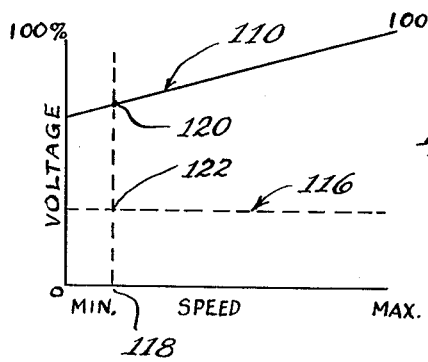
FIGS. 4A through 4F are graphic illustrations of various relationships between the speed and voltage characteristics corresponding to specific embodiments of the control circuit of the present invention.

In accordance with one specific embodiment, when the contacts 32 are closed the variable resistor 92 controls the conduction or firing angle of the TRIAC 20 to provide a first predetermined conduction angle and maximum RMS voltage during each half-cycle at lower operating speeds and a continuously increasing conduction angle and voltage at higher speeds of operation as defined by the curve 110 of FIG. 4A. The variable resistor 92 is arranged to provide a decreased resistance for increasing speed settings. FIG. 4A along with FIGS. 4B through 4F are graphic representations of the maximum RMS voltage applied to the motor 10 during each half-cycle waveform plotted along the ordinate axis versus the governed speed of the motor 10 as defind by the rotational setting of the speed adjustment control 50 along the abscissa. FIGS. 4A through 4F represent specific embodiments representative of various motor control arrangements contemplated by the present invention.

In accordance with other important aspects of the present invention, a parallel control path is provided by an impedance branch connected at one end between the junction of resistors 94 and 96 and at the other end between the junction of the armature circuit 12 and the TRIAC 20. The parallel impedance branch includes a variable resistor 112 and in a specific embodiment a fixed resistor 114 connected in series with the variable resistor 112. As illustrated by curve 116, FIG. 4A, with the contact pair 32 in the open state, a predetermined relatively low conduction angle and maximum voltage during each half-cycle are applied to the motor 10. As the contact pair 32 opens and closes in response to variations in the rotational speed of the motor 10 with a low governed speed setting 118 (FIG. 4A) for example, the maximum voltage and corresponding conduction angle for each half cycle varies between the voltage levels 120 of the curve 110 and 122 of the curve 116. Thus, the characteristics of the motor control circuit are altered from a strictly on-off arrangement provided by a governor arrangement alone without the provision of the independent control path comprising variable resistor 112 and fixed resistor 114. Conventional cogging problems at low operating speeds experienced in appliances utilizing a wide operating range or ratio of speeds are also eliminated since the maximum voltage each half-cycle with the governor contacts open is maintained at a predetermined level to sustain operation at this speed. In this regard, the variable resistor 112 is adjusted to a level which is the maximum voltage under no load conditions of the appliance at which the minimum desired operating speed is not exceeded or somewhat below that level. This voltage level in one specific application was found to be approximately 50 volts. The variation of the voltage supplied to the motor 10 at various speeds when the contacts 32 are closed is defined by the curve 110. The maximum supplied voltage for each half-cycle at relatively low speed settings is thus controlled to eliminate cogging (low speed instability) problems resulting in a more desirable duty cycle of the governor contacts 32.

In accordance with another important aspect of the present invention, the series connection of a variable resistor 130 and a fixed resistor 132 are connected across the variable resistor 92. The resistor 130 is adjusted during manufacture to establish a predetermined low speed voltage setting, i.e. the point 120 on the curve 110. Thus, with the speed control device 50 adjusted to the minimum speed position, the variable resistor 130 is adjusted to establish approximately 80 volts maximum for each half-cycle across the motor with the governor contacts 32 closed.

Figure 4B:
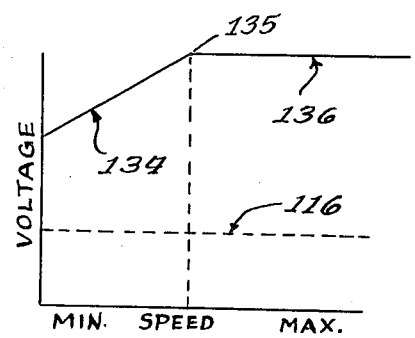
Figure 4C:
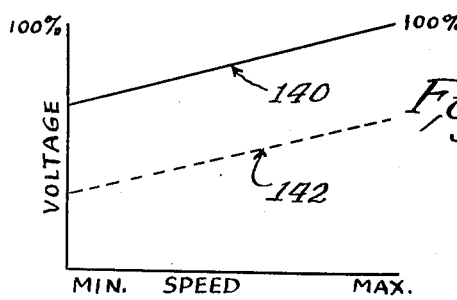
Figure 4D:
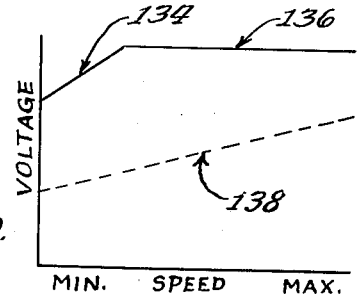

In accordance with yet other important aspects of the present invention and according to specific appliance operating and load parameters, and referring now to FIG. 4B, the variable resistor 92 may be arranged to provide a varying resistance over a predetermined portion of the lower operating speed range as defined by curve 134 and to remain at a fixed resistance level thus providing a fixed maximum voltage for each half-cycle throughout the medium and high speed ranges of operation as defined by the curve 136. Thus, the variable resistor 92 is continuously variable up to the speed corresponding to the point 135 and remains fixed in resistance at higher speeds above that point. Referring now to FIG. 4D, the variable resistor 112 in a specific embodiment is also operably coupled to be rotated with the speed control 50 to provide a variable firing voltage versus speed characteristic when the contacts 32 are opened. As shown in FIG. 4D, the variable voltage versus speed setting characteristics described by curve 138 with the governor contacts open may be combined with the arrangement where the variable resistor 92 is in series with the governor contacts 32 and provides a variable resistance over a predetermined portion of the operating speed range defined by curve portions 134 and 136.

Figure 4E:
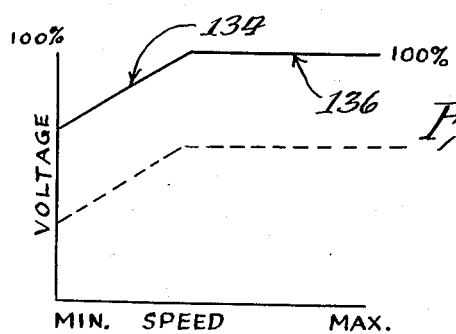
Figure 4F:
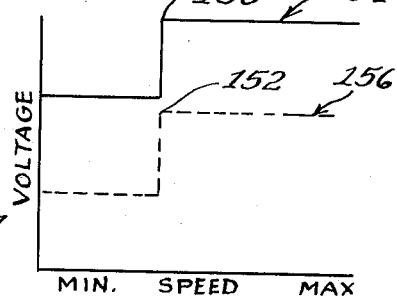

While various arrangements have been described to illustrate the operating voltage control of the present invention, it should be understood that various combinations including fixed resistance levels, variable resistance levels and variable resistances over portions of the operating speed range may be utilized for one or both of the variable resistance elements 92 and 112 to achieve desired product performance and operating characteristics. For example referring to FIG. 4C, the curve 140 illustrates the maximum supplied voltage for each half-cycle when the contacts 32 are closed and the curve 142 illustrates the operating characteristics when the contacts 32 are open. In this specific embodiment, both the variable resistors 92 and 112 are operably coupled so that rotation of the speed adjustment control 50 linearly varies the resistance of each. In FIG. 4E on the other hand, both variable resistors 92 and 112 have been arranged to be varied over a portion of the operating range and to remain fixed over the remaining portion. The speed at which the two variable resistances 92 and 112 change from linearly varying to fixed elements may also be independently determined at different predetermined points for each. In the specific embodiment represented by FIG. 4F, the variable impedance elements provided by variable resistors 92 and 112 are each replaced by a fixed resistor and a switch. The switch is actuated at a predetermined operating setting along the operating range so as to provide a step function of the closed contact and open contact operating curves. As before, the speed settings 150 and 152 at which the switches corresponding to the respective closed contact 154 and open contact 156 operating curves are actuated may be independently determined.

Figure 3:
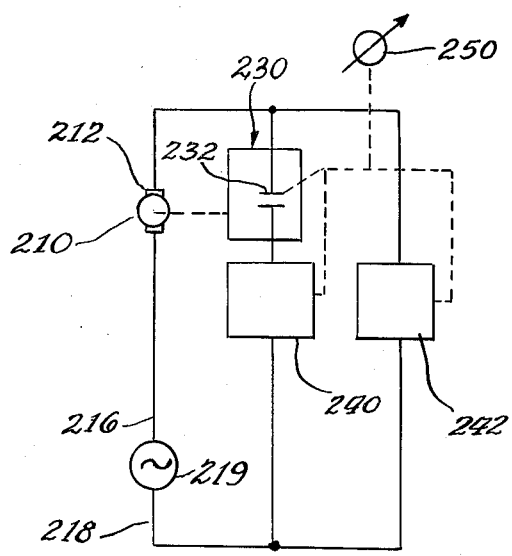
FIG. 3 is an alternate embodiment of the motor control circuit of the present invention of FIG. 1.

Referring now to FIG. 3, the motor control circuit of the present invention is illustrated in conjunction with the control of a motor 210 having an armature circuit 212. The motor 210 to be controlled may be any type of motor-universal, shunt, permanent magnet, shaded pole, etc. The armature circuit 212 is connected in series with the power source connections 216, 218 of an AC power source 219.

A mechanical centrifugally operated governor device 230 (not shown) is coupled to the shaft of the motor 210 in accordance with the arrangement described in connection with FIGS. 1 and 2. The governor device 230 includes a pair of contact terminals 232 defining a switch which is operated by the rotating, centrifugally influenced governor member when the speed of the motor 210 exceeds the predetermined speed to which the governor has been adjusted by means of the speed adjustment device 250 all as described previously.

The speed adjustment device 250, similarly to the device 50 previously described, is also connected to operate a variable power controller referred to generally at 240. The variable power controller 240 is connected in series with the governor contacts 232 and the series combinations is connected across the armature circuit 212 and the power source 219. The variable power controller 240 in one specific embodiment includes a power switching device and a variable impedance device connected in a phase control arrangement to control the power switching device. For example, the variable power controller in one arrangement includes a TRIAC 20, a potentiometer 92 and a capacitor 100 as connected in the control circuit of FIG. 1. The variable power controller 240 with the governor contacts 232 provides a predetermined range of increasing maximum voltages and conduction angles for each half-cycle of the power waveform of source 219 as the rotational speed setting of the speed adjustment device 250 is increased. For example, the variable power controller provides the characteristics of the waveforms 110; 134 and 136; 140; etc. as shown in FIGS. 4A through 4F. A second variable power controller 242 is connected across the series combination of the armature circuit 212 and the power source 219. The variable power controller 242 in specific arrangements comprises any of the previously discussed controllers identical to the controller 240. The variable power controller 242 is also operated and controlled by the speed adjustment device 250 similarly to that of the controller 240. Thus, the variable power controller 242 provides a predetermined maximum voltage for each half-cycle of the power supply waveform from source 219 when the contacts 232 are open in accordance with the characteristics described by curves 116, 142, 138, 156. The predetermined maximum voltage with the contacts 232 in the open state is varied in a predetermined manner in accordance with the setting of the speed adjustment control 250 and the characteristics of the variable control element in the power controller 242.

Concerning the control circuit of FIG. 3 and the various operating characteristics described by the curves in FIGS. 4A through 4F, it should be realized that the power control timing and function of the variable power controllers 240 and 242 are independent of each other. Thus, the curves 116, 138 and 156 characterizing the open-contact operation are determined by the variable power controller 242 alone. Similarly, the curves 110, 134 and 136, 140 and 154 characterizing the closed-contact operations are determined solely by the characteristics of the variable power controller 240. In the case of the motor control circuit of FIG. 1, a single power controller, the TRIAC switching device 20 is utilized under the control of the closed contact variable resistance path defined by potentiometer 92 and the open-contact resistance path provided by variable resistor 112. The curves 110, 134, 136, 140 and 154 characterizing closed-contact characteristics are defined by the parallel combination of the two control paths. Thus, the closed-contact operation may be considered as a composite of the closed-contact and open-contact curves or the closed-contact curves may be considered as representative of the combination of the two control paths for a motor control circuit arranged as in FIG. 1.

While there has been illustrated and described various embodiments of the present invention, it will be apparent that various changes and modifications thereof will occur to those skilled in the art.

For example, the contact pair 32 in an alternate embodiment is connected at one end to the junction of the source 19 and the TRIAC 20 and at the other end to the junction of the resistors 132 and 94. The junction of the resistors 92 and 130 is connected directly to the junction of the armature circuit 12 and the TRIAC 20. The contact pair 32 is then arranged to be open below the adjustable predetermined speed and closed above the adjustable predetermined speed.

Further, and referring now to the speed control device and governor of the aforementioned U.S. Pat. No. 2,703,381, the variable resistor 92 in a specific embodiment is operatively coupled to the cam follower pin 161 as best seen in FIG. 2 of that patent. A potentiometer with a sliding adjustment tap is utilized for the variable resistor 92 with the tap being mechanically coupled to move with the cam follower pin 161. The cam follower pin is also effective to position the adjustable contact arm of the governor arrangement disclosed therein.

It should also be understood that speed responsive devices other than a centrifugally controlled governor device may be utilized in alternate embodiments to practice the present invention.

It is intended in the appended claims to cover all such changes and modifications as fall within the true spirit and scope of the present invention.

What is claimed as new and desired to be secured by Letters Patent of the United States is:

1. A motor control circuit comprising:
   mechanical speed sensing means coupled to the motor being controlled for sensing the speed of rotation and for selectively connecting and interrupting a first circuit path as the speed of the motor varies with respect to an adjustable predetermined speed;
   power switching means having a control input and adapted to be connected in series with a power source connection and the motor to be controlled for selectively connecting the motor to the power source connections;
   manually controlled speed adjustment means connected to said mechanical speed sensing means for selecting said adjustable predetermined speed; and
   phase control means having a first variable impedance element, said phase control means being responsive to said manually controlled speed adjustment means and connected to said control input of said power switching means, said manually controlled speed adjustment means adjusting the impedance of said first variable impedance element, said first circuit path provided by said mechanical speed sensing means being connected in series with said phase control means.

2. The motor control circuit of claim 1 wherein said first variable impedance element is a potentiometer and said manually controlled speed adjustment means comprises a rotary shaft controller coupled to said potentiometer.

3. The motor control circuit of claim 2 wherein said mechanical speed sensing means is a governor device and said circuit path is provided by a contact pair, said governor device comprising a contact arm being displaced in position in accordance with the speed of rotation of the motor, said manually controlled speed adjustment means comprising a movable contact element disposed adjacent said contact arm to position said contact arm in accordance with a selected setting of said rotary shaft controller, said contact pair being defined by said movable contact element and said contact arm.

4. The motor control circuit of claim 3 wherein said speed adjustment means further comprises an eccentric cam carried by said rotary shaft controller and a cam follower, said cam follower carrying said movable contact element.

5. The motor control circuit of claim 4 further comprising means independent of said mechanical speed sensing means for providing a second circuit path to said phase control means.

6. The motor control circuit of claim 5 wherein said second circuit path providing means comprises a second impedance element of a predetermined impedance to supply low speed operating power to the motor.

7. The motor control circuit of claim 6 wherein said second impedance element of said second circuit path providing means is adjusted in value to supply said low speed operating power when said first circuit path is open.

8. The motor control circuit of claim 5 wherein said second circuit path providing means is a variable impedance element responsive to said speed adjustment means.

9. The motor control circuit of claim 1 further comprising means independent of said mechanical speed sensing means for providing a second circuit path to said phase control means.

10. The motor control circuit of claim 9 wherein said second circuit path providing means comprises a second impedance element of a predetermined impedance to supply low speed operating power to the motor.

11. The motor control circuit of claim 10 wherein said second impedance element is adjusted in value to supply said low speed operating power when said first circuit path is open.

12. The motor control circuit of claim 9 wherein said second circuit path providing means is a variable impedance element responsive to said speed adjustment means.

13. The motor control circuit of claim 1 further comprising a second variable impedance element connected across said first variable impedance element.

14. The motor control circuit of claim 13 wherein said second variable impedance element is adjusted to control said power switching means to conduct at a predetermined voltage when said speed adjustment means is at a predetermined adjustment setting.

15. The motor control circuit of claim 14 further comprising a third impedance element connected to control said power switching means independent of and in parallel with said first and second variable impedance elements.

16. The motor control circuit of claim 1 wherein said power switching means further comprises a TRIAC device and said trigger circuit is connected to the control input electrode of said TRIAC.

17. The motor control circuit of claim 16 wherein said trigger circuit comprises a DIAC element connected between said gate control electrode of said TRIAC device and said control input of said power switching means and a capacitor connected between said control input and one side of the power source connection.

18. The motor control circuit of claim 1 wherein said mechanical speed sensing means provides said first circuit path when the speed of the motor is below said adjustable predetermined speed and opens said first circuit path when the speed is above said adjustable predetermined speed.

19. The motor control circuit of claim 1 wherein said phase control means provides a predetermined variable control characteristic of said power switching means in accordance with said adjustable predetermined speed selected by said manually controlled speed adjustment means.

20. A motor control circuit comprising:
mechanical governor means coupled to the motor being controlled for closing a governor contact pair to establish a circuit path when the rotational speed of the motor is below a predetermined speed and opening said governor contact pair to interrupt said circuit path when the rotational speed of the motor is above said predetermined speed, the relative positioning between said governor contact pair being determined in accordance with the rotational speed of the motor;
power switching means having a control lead and adapted to be connected in series with a power source connection and the motor to be controlled for selectively connecting the motor to the power source connections;
manually controlled speed adjustment means for controlling said relative positioning of said governor contact pair, said relative positioning of said governor contact pair determining the adjustable predetermined rotational speed at which said governor contact pair operates; and
phase control means having a first variable impedance element, said phase control means being responsive to said manually controlled speed adjustment means and connected to said control lead of said power switching means, said manually controlled speed adjustment means adjusting the impedance of said first variable impedance element for controlling said power switching means, said circuit path controlled by said governor contact pair being connected in series with said phase control means.

* * * * *